United States Patent
Sudak et al.

(10) Patent No.: US 8,046,024 B2
(45) Date of Patent: Oct. 25, 2011

(54) MULTI-RADIO PLATFORM WITH WIMAX AND BLUETOOTH RADIO MODULES AND METHOD

(75) Inventors: Eran Sudak, Tel Aviv (IL); Xingang Guo, Portland, OR (US); Xue Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 11/928,527

(22) Filed: Oct. 30, 2007

(65) Prior Publication Data

US 2009/0111500 A1   Apr. 30, 2009

(51) Int. Cl.
*H04B 13/02* (2006.01)
*H04B 5/00* (2006.01)
*H04M 1/00* (2006.01)

(52) U.S. Cl. ............... 455/552.1; 455/553.11; 455/41.2; 455/40; 455/41.1

(58) Field of Classification Search .................. 455/41.1, 455/41.2, 78, 426.1, 426.2
See application file for complete search history.

(56) References Cited

U.S. PATENT DOCUMENTS

| 7,542,728 B2* | 6/2009 | Bitran et al. | 455/73 |
| 7,567,820 B2* | 7/2009 | Bitran et al. | 455/552.1 |
| 7,606,590 B2* | 10/2009 | Karabinis | 455/522 |
| 7,822,436 B2* | 10/2010 | Bitran et al. | 455/550.1 |
| 7,904,112 B2* | 3/2011 | Bitran et al. | 455/552.1 |
| 2007/0224936 A1* | 9/2007 | Desai | 455/41.2 |
| 2008/0247367 A1* | 10/2008 | Guo et al. | 370/338 |
| 2009/0017756 A1* | 1/2009 | Tsfaty et al. | 455/41.2 |
| 2009/0054009 A1* | 2/2009 | Yang et al. | 455/78 |

* cited by examiner

*Primary Examiner* — Tilahun B Gesesse
(74) *Attorney, Agent, or Firm* — Schwegman, Lundberg & Woessner, P.A.; Gregory J. Gorrie

(57) ABSTRACT

Embodiments of a multi-radio platform with longer-range and shorter-range radio modules and method are generally described herein. Other embodiments may be described and claimed. In some embodiments, a transmit power level is set for transmissions by a shorter-range radio module during a reception by a longer-range radio module to a lesser of a maximum allowed power level or a next requested power level when transmit step-down mode is enabled. The transmit power level is set to the next requested power level when the longer-range radio module is not transmitting. The shorter-range radio module refrains from transmitting when a transmit-kill mode is enabled during the reception by the longer-range radio module.

18 Claims, 2 Drawing Sheets

MULTI-RADIO PLATFORM WITH WIMAX AND BLUETOOTH RADIO MODULES AND METHOD

TECHNICAL FIELD

Some embodiments pertain to wireless communications. Some embodiments pertain to multi-radio wireless communication devices. Some embodiments pertain to coexistence between WiMax and Bluetooth communication devices.

BACKGROUND

Multi-radio platforms are wireless communication devices with co-located transceivers that communicate using two or more communication techniques. One issue with multi-radio platforms is that interference between receptions and transmissions of the co-located transceivers may result in packet loss from collisions degrading the communication abilities of the radios. This is especially a concern in multi-radio platforms that include a longer-range transceiver, such as a Worldwide Interoperability for Microwave Access (WiMax) transceiver, and a shorter-range transceiver, such as a Bluetooth (BT) transceiver, particularly when their frequency spectrums are adjacent and/or overlap.

Thus, there are general needs for multi-radio wireless communication devices and methods that coordinate activities between the transceivers of multi-radio platforms.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
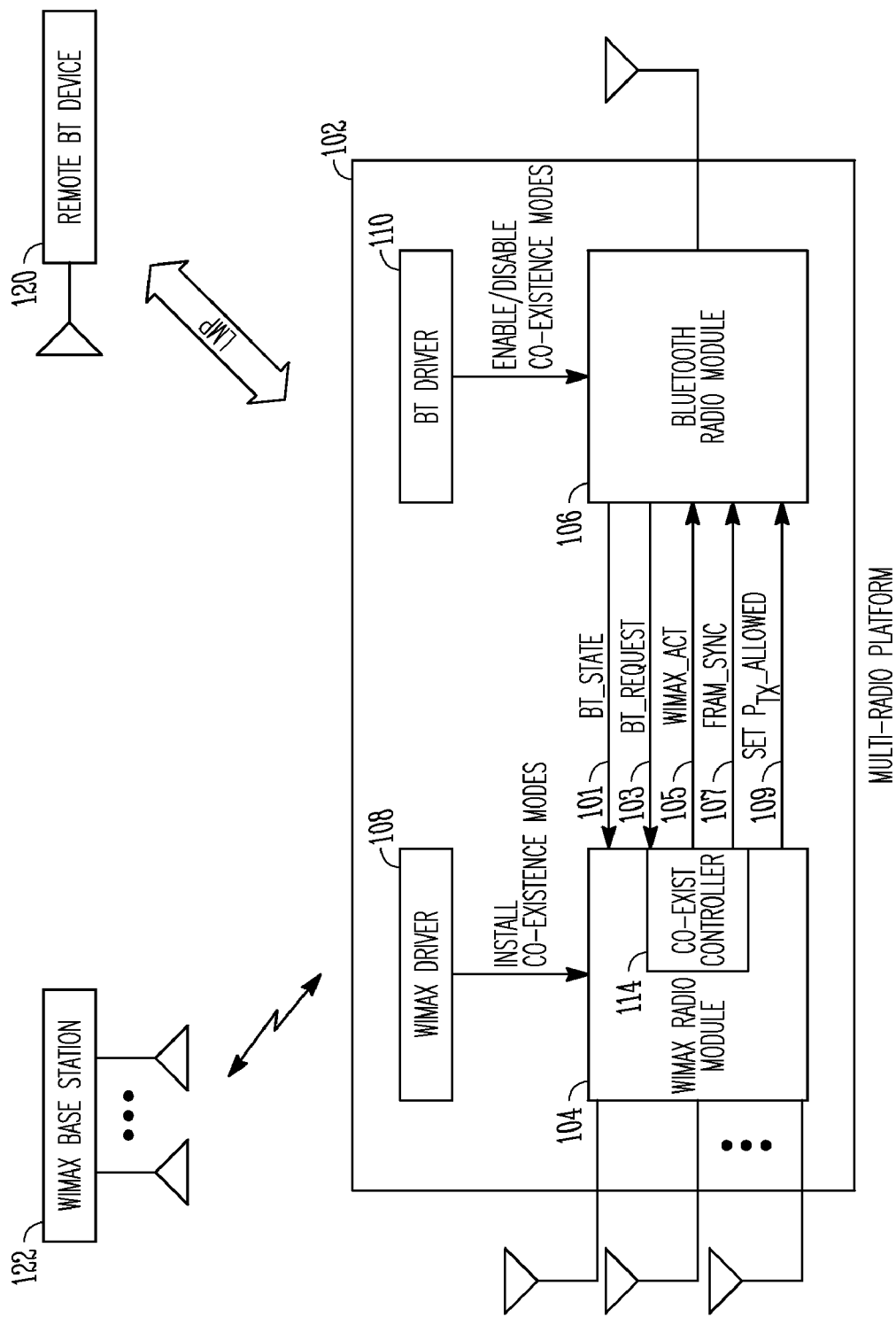
FIG. 1 illustrates a communication environment including a multi-radio platform in accordance with some embodiments of the present invention.

FIG. 1 illustrates a communication environment including a multi-radio platform in accordance with some embodiments of the present invention. Communication environment 100 may include multi-radio platform 102, a base station, such as WiMax base station 122, and a remote device, such remote BT device 122. Multi-radio platform 102 may communicate with base station 122 using a longer-range radio module, such as WiMax radio module 104, and may communicate with remote device 120 using a shorter-range radio module, such as BT radio module 106. Although base station 122 and radio module 104 are illustrated as WiMax devices, and although remote device 120 and radio module 106 are illustrated as BT devices, the scope of the invention is not limited in these respects. Other example embodiments are discussed in below.

One issue with a multi-radio platform, such as multi-radio platform 102, is that transmissions to remote device 120 may interfere with concurrent receptions from base station 122. In some example embodiments, shorter-range radio module 106 may be configured to either set the transmission power level, or refrain or terminate shorter-range transmissions depending on signals provided by longer-range radio module 104 indicating whether longer-range radio module 104 is receiving, whether a step-down mode is enabled, or whether a transmit-kill mode is enabled. When longer-range radio module 104 is not receiving, shorter-range radio module 106 may be free to transmit without restriction. When longer-range radio module 104 is receiving, shorter-range radio module 106 may step down its transmit power level when step-down mode is enabled. When longer-range radio module 104 is receiving, shorter-range radio module 106 may refrain from transmitting or may terminate a current transmission when transmit-kill mode is enabled.

In accordance with some example embodiments, longer-range radio module 104 is configured to set a transmit power level ($P_{TX}$) for transmissions by shorter-range radio module 106 during a reception by longer-range radio module 104 to a lesser of a maximum allowed power level ($P_{TX\_ALLOWED}$) or a next requested power level ($P_{NEXT}$) when transmit step-down mode is enabled. Longer-range radio module 104 is also configured to set the transmit power level to the next requested power level when longer-range radio module 104 is not transmitting. Longer-range radio module 104 is also configured to cause shorter-range radio module 106 to refrain from transmitting when a transmit-kill mode is enabled during the reception by longer-range radio module 104. In some example embodiments, when the transmit power level is set by shorter-range radio module 106 to the next requested power level and when longer-range radio module 104 is not receiving, the next requested power level is permitted to be greater than the maximum allowed power level. These example embodiments are discussed in more detail below.

In some example embodiments, remote device 120 may communicate with shorter-range radio module 106 over a wireless link implementing a link management protocol (LMP). As part of the LMP, a power control state machine may be maintained by shorter-range radio module 106. In these example embodiments, remote device 120 may request an increase or a decrease in the transmit power level with LMP power control messages. Remote device 120 may also request that the current transmit power level be maintained with the LMP power control messages. In response, shorter-range radio module 106 may set the transmit power level to as discussed herein depending on the mode or operation, or terminate or refrain from transmitting depending on the operations of longer-range radio module 104. In these embodiments, the setting of the transmit power level may be implemented as part of the power control procedures of the LMP, and $P_{NEXT}$ may be updated according to LMP commands received from remote device 120 allowing the LMP power control procedures to operate normally. The power control state machine may be maintained by shorter-range radio module 106 in parallel with the real-time transmit power decisions discussed herein.

Shorter-range radio module 106 may implement a short-haul wireless protocol frequency hopping spread-spectrum (FHSS) communication technique, and longer-range radio module 104 may implement a broadband wireless access communication technique, which may comprise orthogonal frequency division multiple access (OFDMA), although other shorter-range and longer-range communication techniques may also be suitable. Shorter-range radio module 106 and longer-range radio module 104 may utilize overlapping frequency spectrums for their communications. The short-haul wireless protocol FHSS communication technique may operate in the 2.4 GHz spectrum. The broadband wireless access communication technique comprising OFDMA and may operate within the 1-11 GHz spectrum, although the scope of the invention is not limited in this respect. In these embodiments, interference may result between the shorter-range and longer-range radio modules due to use of near and/or overlapping spectrum as well as out-of-band (OOB) emissions.

In some example embodiments mentioned above, when shorter-range radio module 106 comprises a BT radio module, it may include a BT transmitter and BT receiver. When longer-range radio module comprises a WiMax radio module, it may include a WiMax transmitter and a WiMax receiver.

In some example embodiments, longer-range radio module 104 may include coexist controller 114 to coordinate longer-range and shorter-range radio operations. Coexist controller 114 may be configured to either assert or de-assert WiMax active signal 105 for radio module 106, provide frame sync signal 107 to radio module 106, and receive BT state signal 101 and BT request signal 103 from radio module 106. These signals are discussed in more detail below.

Coexist controller 114 may assert WiMax active signal 105 to indicate to radio module 106 that radio module 104 is receiving, and may further provide receive protection mode signal 109 to radio module 106 to indicate whether the transmit step-down mode is enabled or the transmit-kill mode is enabled. Radio module 106 may be responsive to the assertion of WiMax active signal 105 and receipt of receive protection mode signal 109 by either setting the transmit power level for the transmissions by radio module 106 during WiMax reception to the lesser of the maximum allowed power level or the next requested power level when the transmit step-down mode is enabled, refraining from transmitting when transmit-kill mode is enabled, or terminating a current transmission when transmit-kill mode is enabled.

In some example embodiments, the maximum allowed power level may be provided from coexist controller 114 to radio module 106. To help improve performance, a user may be able to override the constraints placed on the transmission power level of radio module 106. This may allow the transmit power level of radio module 106 to be adjusted automatically, for example, by the LMP, up to the maximum power level supported by radio module 106. In this situation, the maximum transmission power level may exceed the maximum allowed power level and may be implemented at times, for example, when radio module 104 is not being used.

Coexist controller 114 may be configured to determine the maximum allowed power level based on a 1 dB desensitization level ($P_{Desnse}$). In these embodiments, the desensitization level may be determined from a desired desensitization level, WiMax radio design, momentary sensitivity level (e.g., gain) of radio module 104, isolation between the antennas, etc. In some embodiments, the maximum allowed power level may be set to 1 dB desensitization level ($P_{Desnse}$) plus the antenna isolation (I) regardless of momentary conditions. In some other embodiments, the maximum allowed power level may be dynamically set based on momentary conditions. In these embodiments, radio module 104 may update coexist controller 114 with $P_{Desnse}$. When it is updated, coexist controller 114 may set the maximum allowed power level equal to $P_{Desnse}^{+/-\alpha}$. $\alpha$ may be a factor that takes into account pre-dicted changes (e.g., the slope) of $P_{Desnse}$ and the time it takes to communicate the new value to radio module 104 so as not to leave radio module 104 momentarily compromised.

In some example embodiments, the maximum allowed power level may be stored in a persistent storage element of shorter-range radio module 106. In these embodiments, no separate communication path, such as signal path 109, may need to be provided to allow the maximum allowed power level to be communicated from radio module 104 to radio module 106.

In some example embodiments, a request from remote device 120 may be received over a wireless link implementing the LMP, discussed earlier, to increase, decrease, or maintain the transmit power level of the transmissions by radio module 106 to remote device 120. When the next requested power level is greater than the maximum allowed power level, and when radio module 104 is receiving, the transmit power level for the next transmission may be set to the maximum allowed power level. In these embodiments, remote device 120 may determine whether or not to request an increase or a decrease in the transmit power level, or to maintain the current transmit power level, based on received signal strength (e.g., an RSSI level) of signals received at remote device 120.

Coexist controller 114 may assert WiMax active signal 105 any time radio module 104 is receiving, such as during receipt of a downlink subframe. Radio module 106 may align a slot boundary of either a master-to-slave or a slave-to-master slot based on timing information conveyed by frame sync signal 107 provided by coexist controller 114. In some embodiments, the slot boundary may be aligned with either a master-to-slave or a slave-to-master slot with a predetermined or a configurable amount of offset. Coexist controller 114 may de-assert WiMax active signal 105 during non-receptions periods, such as during the transmission of an uplink subframe, by radio module 104.

In these embodiments, frame sync signal 107 provides timing information for the synchronization between radio module 106 and radio module 104. In some embodiments, voice packets, streamed audio and/or video packets, general data packets, and/or human interface active packets, for example, may be communicated between remote device 120 and radio module 106 of the multi-radio wireless communication device 102.

In these embodiments, BT state signal 101 may be asserted by radio module 106 to gain priority over WiMax operations (e.g., for discovery service or link setup operations). Coexist controller 114 may elect, in response to the assertion of BT state signal 101, whether or not to de-assert WiMax active signal 105 and give radio module 106 priority. In these embodiments, coexist controller 114 may determine whether or not to give radio module 106 priority when BT state signal 101 is asserted based on policies set within coexist controller 114. In some embodiments, these policies may be set through software by a network administrator, although the scope of the invention is not limited in this respect. BT request signal 103 may indicate that radio module 106 is requesting assess to the wireless medium. Coexist controller 114 may elect, in response to the assertion of BT state signal 101 and receipt of BT request signal 103 whether or not to de-assert WiMax active signal 105 and allow radio module 106 access to the medium.

Multi-radio platform 102 may also include WiMax driver 108 to initiate and/or install coexistence modes on radio module 104. Multi-radio platform 102 may also include BT driver 110 to either enable or disable coexistence modes on radio module 106. Coexistence modes allow radio module 104 and radio module 106 to coexist by coordinating their communications as discussed herein.

In some embodiments, multi-radio platform 102 may be configured to may relay information, such as voice, between remote device 120 and base station 122. For example, remote device 120 may be a BT headset or other human-interface device, and base station 122 may be coupled with a service network allowing voice information to be communicated (e.g., relayed) between the BT headset and a telephone network, although the scope of the invention is not limited in this respect. In some embodiments, Voice-over-Internet Protocol (VoIP) data may be communicated between base station 122 and the service network, although the scope of the invention is not limited in this respect. In some embodiments, audio content may be transferred from multi-radio platform 102 to remote device 120 while base station 122 is communicating with multi-radio platform 102, although the scope of the invention is not limited in this respect.

Although multi-radio platform 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of multi-radio platform 102 may refer to one or more processes operating on one or more processing elements.

Figure 2:
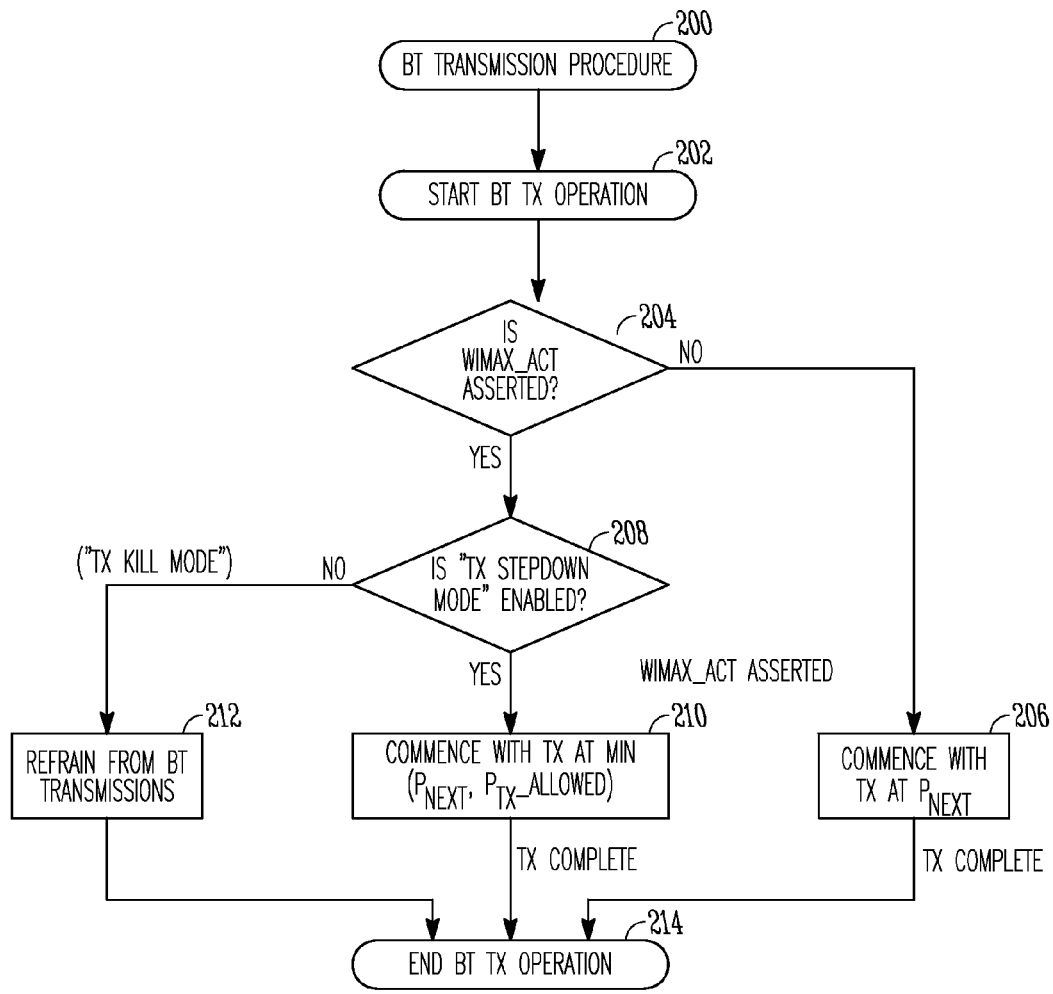
FIG. 2 is a flow chart of a procedure for operating a multi-radio platform in accordance with some embodiments of the present invention.

FIG. 2 is a flow chart of a procedure for operating a multi-radio platform in accordance with some embodiments of the present invention. Procedure 200 may be performed by a shorter-range radio module, such as radio module 106 (FIG. 1), to either set the transmission power level or refrain or terminate shorter-range transmissions.

Referring to FIGS. 1 and 2, in these embodiments, shorter-range radio module 106 may be responsive to signals provided by coexist controller 114 indicating whether longer-range radio module 104 is receiving, whether step-down mode is enabled, or whether transmit-kill mode is enabled. When longer-range radio module 104 is not receiving, shorter-range radio module 106 may be free to transmit without restriction. When longer-range radio module 104 is receiving, shorter-range radio module 106 may step down its transmit power level when step-down mode is enabled. When longer-range radio module 104 is receiving, shorter-range radio module 106 may refrain from transmitting or terminate a current transmission when transmit-kill mode is enabled.

In operation 202, a transmit operation may be initiated by radio module 106 (e.g., for a BT transmission). The transmit operation may be based on the LMP and/or the synchronization discussed above.

In operation 204, radio module 106 determines whether or not WiMax active signal 105 is asserted. When WiMax active signal 105 is asserted indicating that radio module 104 is receiving, operation 208 is performed. When WiMax active signal 105 is not asserted, operation 206 is performed.

In operation 206, radio module 106 may commence with transmissions to remote device 120 at the next requested power level as discussed above. Radio module 106 may refrain or terminate any transmissions at any time during operation 206 if WiMax active signal 105 is asserted.

In operation 208, radio module 106 determines whether or not transmit step-down mode is enabled by evaluating signal 109. When transmit step-down mode is enabled, operation 210 is performed. When transmit step-down mode is not enabled, transmit-kill mode may be enabled and operation 212 is performed.

In operation 210, radio module 106 may commence with transmissions to remote device 120 by setting its transmit power level to a lesser of the maximum allowed power level and the next requested power level.

In operation 212, radio module 106 may refrain from commencing with any transmissions because transmit-kill mode is enabled. Any ongoing transmissions performing as part of either operations 206 and 208 may be terminated when transmit-kill mode is enabled and WiMax active signal 105 is asserted.

In operation 214, radio module 106 may end it transmit operations, for example, based on the LMP. Procedure 200 may be repeated for a next transmission or set of transmissions by radio module 106.

Although the individual operations of procedure 200 are illustrated and described as separate operations, one or more of the individual operations may be performed concurrently, and nothing requires that the operations be performed in the order illustrated. In some embodiments, procedure 200 may correspond to a state machine illustrating various states of radio module 106.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating a multi-radio platform comprising:
setting a transmit power level for radio-frequency transmissions by a shorter-range radio module during a reception by a longer-range radio module to a lesser of a maximum allowed power level or a next requested power level when transmit step-down mode is enabled;

setting the transmit power level for the radio-frequency transmissions by the shorter-range radio module to the next requested power level when the longer-range radio module is not transmitting; and refraining from transmitting by the shorter-range radio module when a transmit-kill mode is enabled during the reception by the longer-range radio module, wherein the next requested power level is received in a request from a remote device in communication with the shorter-range radio module.

2. The method of claim 1 wherein the shorter-range radio module comprises a Bluetooth (BT) radio module comprising a BT transmitter and BT receiver, and wherein the longer-range radio module comprises a Worldwide Interoperability for Microwave Access (WiMax) radio module comprising a WiMax transmitter and a WiMax receiver.

3. The method of claim 2 further comprising:

asserting, by a coexist controller of the WiMax radio module, a WiMax active signal to indicate to the BT radio module that the WiMax radio module is receiving; and providing a receive protection mode signal to the BT radio module to indicate whether the transmit step-down mode is enabled or the transmit-kill mode is enabled.

4. The method of claim 3 wherein the BT radio module is responsive to the assertion of the WiMax active signal and receipt of the receive protection mode signal by either:

setting the transmit power level for the BT transmissions by the BT radio module during the WiMax reception to the lesser of the maximum allowed power level or the next requested power level when the transmit step-down mode is enabled; or refraining from transmitting BT transmissions or terminating a current BT transmission when the transmit-kill mode is enabled.

5. The method of claim 4 further comprising providing the maximum allowed power level from the coexist controller to the BT radio module.

6. The method of claim 5 further comprising determining the maximum allowed power level by the coexist controller based on a 1 dB desensitization level.

7. The method of claim 3 further comprising receiving a request from the remote BT device over BT wireless link implementing a link management protocol to either increase or decrease a power level of the BT transmissions by the BT radio module, wherein when the remote BT device requests an increase in the power level and when the next requested power level is greater than the maximum allowed power level and when the WiMax radio module is receiving, the method comprises setting transmit power level for the next BT transmission to the maximum allowed power level.

8. The method of claim 3 further comprising:

asserting the WiMax active signal by the coexist controller during receipt of a downlink sub frame;

aligning, by the BT radio module, a slot boundary of either master-to-slave or slave-to-master slot based on timing information conveyed by a frame sync signal; and de-asserting the WiMax active signal by the coexist controller during non-receptions periods by the WiMax radio module.

9. A method for operating a multi-radio platform comprising:

setting a transmit power level for transmissions by a shorter-range radio module during a reception by a longer-range radio module to a lesser of a maximum allowed power level or a next requested power level when transmit step-down mode is enabled;

setting the transmit power level to the next requested power level when the longer-range radio module is not transmitting; and refraining from transmitting by the shorter-range radio module when a transmit-kill mode is enabled during the reception by the longer-range radio module, wherein when the transmit power level is set to the next requested power level and when the longer-range radio module is not transmitting, the next requested power level is permitted to be greater than the maximum allowed power level.

10. A method for operating a multi-radio platform comprising:

setting a transmit power level for transmissions by a shorter-range radio module during a reception by a longer-range radio module to a lesser of a maximum allowed power level or a next requested power level when transmit step-down mode is enabled;

setting the transmit power level to the next requested power level when the longer-range radio module is not transmitting; and refraining from transmitting by the shorter-range radio module when a transmit-kill mode is enabled during the reception by the longer-range radio module, wherein the maximum allowed power level is stored in a persistent storage element of the shorter-range radio module wherein the shorter-range radio module utilizes a short-haul wireless protocol implementing a frequency hopping spread-spectrum communication technique, wherein the longer-range radio module utilizes a broadband wireless access communication technique comprising orthogonal frequency division multiple access, and wherein the shorter-range radio module and the longer-range radio module utilize overlapping frequency spectrums for their communications.

11. A multi-radio platform comprising:

a longer-range radio module; and a shorter-range radio module, wherein the longer-range radio module is configured to:

set a transmit power level for radio-frequency transmissions by the shorter-range radio module during a reception by a longer-range radio module to a lesser of a maximum allowed power level or a next requested power level when transmit step-down mode is enabled, set the transmit power level for the radio-frequency transmissions by the shorter-range radio module to the next requested power level when the longer-range radio module is not transmitting, and cause the shorter-range radio module to refrain from transmitting when a transmit-kill mode is enabled during the reception by the longer-range radio module, wherein the next requested power level is received in a request from a remote device in communication with the shorter-range radio module.

12. The multi-radio platform of claim 11 wherein when the transmit power level is set to the next requested power level and when the longer-range radio module is not transmitting, the longer-range radio module permits the next requested power level to be greater than the maximum allowed power level.

13. The multi-radio platform of claim 11 wherein the shorter-range radio module comprises a Bluetooth (BT) radio module comprising a BT transmitter and BT receiver, and wherein the longer-range radio module comprises a Worldwide Interoperability for Microwave Access (WiMax) radio module comprising a WiMax transmitter and a WiMax receiver.

14. The multi-radio platform of claim 13 wherein the WiMax radio module comprises a coexist controller configured to assert a WiMax active signal to indicate to the BT radio module that the WiMax radio module is receiving, and wherein the coexist controller is further configured to provide a receive protection mode signal to the BT radio module to indicate whether the transmit step-down mode is enabled or the transmit-kill mode is enabled.

15. The multi-radio platform of claim 14 wherein in response to the assertion of the WiMax active signal and receipt of the receive protection mode signal, the BT radio module is configured to either:
set the transmit power level for the BT transmissions during the WiMax reception to the lesser of the maximum allowed power level or the next requested power level when the transmit step-down mode is enabled; or
refrain from transmitting BT transmissions or terminate a current BT transmission when the transmit-kill mode is enabled.

16. A multi-radio platform comprising:
a longer-range radio module; and
a shorter-range radio module,
wherein the longer-range radio module is configured to:
set a transmit power level for transmissions by the shorter-range radio module during a reception by a longer-range radio module to a lesser of a maximum allowed power level or a next requested power level when transmit step-down mode is enabled,
set the transmit power level to the next requested power level when the longer-range radio module is not transmitting, and
cause the shorter-range radio module to refrain from transmitting when a transmit-kill mode is enabled during the reception by the longer-range radio module,
wherein the shorter-range radio module is a short-haul wireless protocol implementing a frequency hopping spread-spectrum communication technique,
wherein the longer-range radio module utilizes a broadband wireless access communication technique comprising orthogonal frequency division multiple access, and
wherein the shorter-range radio module and the longer-range radio module utilize overlapping frequency spectrums for their communications.

17. A method for operating a multi-radio platform comprising a first radio module and a second radio module that utilize overlapping frequency spectrums for their communications, the method comprising:
asserting, by a coexist controller of the first radio module, a first-radio module active signal to indicate to the second radio module that the first radio module is receiving;
providing a receive protection mode signal to the second radio module to indicate whether a transmit step-down mode is enabled or a transmit-kill mode is enabled;
setting a transmit power level for radio-frequency transmissions by the second radio module during a reception by the first radio module to a lesser of a maximum allowed power level or a next requested power level when the transmit step-down mode is enabled;
setting the transmit power level for the radio-frequency transmissions by the shorter-range radio module to the next requested power level when the longer-range radio module is not transmitting;
refraining from transmitting by the second radio module when the transmit-kill mode is enabled during the reception by the first radio module,
wherein the next requested power level is received in a request from a remote device in communication with the shorter-range radio module.

18. A method for operating a multi-radio platform comprising a first radio module and a second radio module that utilize overlapping frequency spectrums for their communications, wherein the second radio module implements a frequency hopping spread-spectrum communication technique, and wherein the first radio module implements an orthogonal frequency division multiple access communication technique,
wherein the method comprises:
asserting, by a coexist controller of the first radio module, a first-radio module active signal to indicate to the second radio module that the first radio module is receiving;
providing a receive protection mode signal to the second radio module to indicate whether a transmit step-down mode is enabled or a transmit-kill mode is enabled;
setting a transmit power level for transmissions by the second radio module during a reception by the first radio module to a lesser of a maximum allowed power level or a next requested power level when the transmit step-down mode is enabled; and
refraining from transmitting by the second radio module when the transmit-kill mode is enabled during the reception by the first radio module.

* * * * *

UNITED STATES PATENT AND TRADEMARK OFFICE
CERTIFICATE OF CORRECTION

| | |
|---|---|
| PATENT NO. | : 8,046,024 B2 |
| APPLICATION NO. | : 11/928527 |
| DATED | : October 25, 2011 |
| INVENTOR(S) | : Sudak et al. |

It is certified that error appears in the above-identified patent and that said Letters Patent is hereby corrected as shown below:

On the Title Page, Item (75), in "Inventors", in column 1, line 6, delete "Portand," and insert -- Portland, --, therefor Signed and Sealed this
Eleventh Day of November, 2014

Michelle K. Lee
*Deputy Director of the United States Patent and Trademark Office*